United States Patent
Hoersch (10) Patent No.: US 11,441,723 B2
(45) Date of Patent: Sep. 13, 2022

(54) STIRRUP BRACKET

(71) Applicant: Adam Hall GmbH, Neu-Anspach (DE)

(72) Inventor: Marco Hoersch, Hamburg (DE)

(73) Assignee: Adam Hall GmbH, Neu-Anspach (DE)

( * ) Notice: Subject to any disclaimer, the term of this patent is extended or adjusted under 35 U.S.C. 154(b) by 282 days.

(21) Appl. No.: 16/689,696

(22) Filed: Nov. 20, 2019

(65) Prior Publication Data

US 2020/0158280 A1 May 21, 2020

(30) Foreign Application Priority Data

Nov. 20, 2018 (DE) ...................... 20 2018 106 578.5

(51) Int. Cl.
*F16M 11/02* (2006.01)
*F16M 13/02* (2006.01)

(52) U.S. Cl.
CPC ............. *F16M 11/02* (2013.01); *F16M 13/02* (2013.01); *F16M 2200/063* (2013.01)

(58) Field of Classification Search
CPC ....... H04R 1/026; F21V 21/30; F21V 21/116; F21V 21/26; F21V 21/088; F21W 2131/406; F16M 11/10; F16M 13/00; F16M 13/02; F16M 13/022; F16M 13/027; F16M 11/02; F16M 2200/063
USPC ............. 248/308; 403/59, 591, 83, 112–113; 362/426
See application file for complete search history.

(56) References Cited

U.S. PATENT DOCUMENTS

| | | | | | |
|---|---|---|---|---|---|
| 3,662,981 | A | * | 5/1972 | Hogrebe ................ | F16M 11/10 248/278.1 |
| 3,733,042 | A | * | 5/1973 | Jungjohann ......... | F16C 11/0619 312/328 |
| 3,747,884 | A | * | 7/1973 | Steisslinger ........... | F16M 11/14 248/181.1 |
| 4,964,606 | A | * | 10/1990 | Beam ..................... | F16M 11/14 248/188.5 |
| 5,205,645 | A | * | 4/1993 | Lee ........................ | F16M 11/10 362/287 |
| 5,775,652 | A | * | 7/1998 | Crawshaw ............ | F21V 21/088 248/230.6 |
| 6,213,626 | B1 | * | 4/2001 | Qian ...................... | F16M 11/10 248/125.8 |

(Continued)

FOREIGN PATENT DOCUMENTS

CN 2324781 Y 6/1999
CN 201571261 U 9/2010
(Continued)

OTHER PUBLICATIONS

Chinese Search Report for Chinese Application No. CN 201911141943.5 dated Mar. 23, 2021, 3 pages.
(Continued)

*Primary Examiner* — Ingrid M Weinhold
(74) *Attorney, Agent, or Firm* — Howard & Howard Attorneys PLLC (57) ABSTRACT

A stirrup bracket includes two supporting arms arranged spaced from one another and a connecting arm comprising two end regions which are connected with one corresponding connecting region of the supporting arms. Additionally, the connecting arm is provided with a connecting spigot being pivot-mounted between an idle position and an operating position.

17 Claims, 6 Drawing Sheets

(56) References Cited

U.S. PATENT DOCUMENTS

| | | | | |
|---|---|---|---|---|
| 6,536,731 | B1* | 3/2003 | Tegland | F16M 11/041 211/100 |
| 7,624,955 | B2* | 12/2009 | McGill | F16M 11/041 248/346.06 |
| 7,938,570 | B2* | 5/2011 | Lee | F21V 21/116 362/652 |
| 9,062,823 | B2 | 6/2015 | Pan et al. | |
| 9,255,697 | B2* | 2/2016 | Acampora | F21V 33/006 |
| 10,098,452 | B2 | 10/2018 | Ko | |
| 10,697,597 | B2* | 6/2020 | Salm | F21V 21/088 |
| 2007/0278366 | A1* | 12/2007 | McGill | F16M 13/00 248/176.3 |
| 2010/0133414 | A1 | 6/2010 | Lee et al. | |
| 2010/0157602 | A1* | 6/2010 | Nichols | F21V 21/116 362/277 |
| 2013/0027934 | A1* | 1/2013 | Velazquez | F21V 23/009 362/249.01 |
| 2013/0058106 | A1* | 3/2013 | Acampora | F21V 33/006 362/368 |
| 2013/0155688 | A1* | 6/2013 | LaVigna | F21V 29/74 362/311.01 |
| 2016/0252800 | A1* | 9/2016 | Jeong | F16M 11/2021 224/576 |

FOREIGN PATENT DOCUMENTS

| | | |
|---|---|---|
| CN | 103423561 A | 12/2013 |
| CN | 106166975 A | 11/2016 |
| EP | 2781689 A1 | 9/2014 |
| WO | 2016190542 A1 | 12/2016 |

OTHER PUBLICATIONS

English language abstract for CN 2324781 Y extracted from espacenet.com database on Apr. 12, 2021, 1 page.

English language abstract for CN 201571261 U extracted from espacenet.com database on Apr. 12, 2021, 2 pages.

English language abstract for CN 103423561 A extracted from espacenet.com database on Apr. 12, 2021, 2 pages.

English language abstract for CN 106166975 A extracted from espacenet.com database on Apr. 12, 2021, 2 pages.

English language abstract for WO 2016/190542 A1 extracted from espacenet.com database on Apr. 12, 2021, 2 pages.

\* cited by examiner

STIRRUP BRACKET

CROSS-REFERENCE TO RELATED APPLICATIONS

This application claims priority to German Utility Model Application No. DE 20 2018 106578.5, filed Nov. 20, 2018, the entire contents of which are hereby incorporated by reference.

TECHNICAL FIELD

The invention relates to a stirrup bracket according to the preamble of patent claim 1.

BACKGROUND

Such stirrup brackets are, for example, used for positioning or hanging up of video, light and/or sound appliances. For this purpose, the stirrup brackets comprise supporting arms being arranged spaced from one another which are connected with each other via a connecting arm and thus form, for example, U-shaped stirrup brackets. When, for example, such stirrup brackets should be attached to clamps, a connecting spigot is fixed on the connecting arm which protrudes outwardly. This, however, results in the disadvantage that this connecting spigot which protrudes outwardly is obstructive during the installation of the known stirrup bracket and, in some circumstances, it has to be removed in an elaborate manner.

Therefore, it is an object of the present invention to provide a stirrup bracket of the kind according to the preamble of patent claim 1 which can easily be handled and which can be connected with supporting clamps and/or supporting rails in a non-intricate technical manner.

This object is solved by the features of patent claim 1.

SUMMARY

In detail, the stirrup bracket according to the present invention comprises two supporting arms being arranged spaced from one another which are connected with each other via a connecting arm. Here, the supporting arms can have a linear or cranked form so that, for example, a U-shaped or at least a U-like configuration can be obtained.

At the connecting arm of the stirrup bracket according to the present invention a connecting spigot is provided which is pivot-mounted between an idle position and an operating position. In the idle position the connecting spigot which is also referred to as spigot plunges into an accommodating opening which is provided in the connecting arm so that it does not protrude outwardly in this idle position and accordingly is not obstructive during the use of the stirrup bracket according to the present invention as pedestal.

In the operating position the connecting spigot can be pivoted outwardly so that then, for example, it is possible to connect it with a supporting clamp or a supporting rail.

The dependent claims comprise advantageous embodiments of the invention.

BRIEF DESCRIPTION OF THE DRAWINGS

Further details, features and advantages of the invention result from the following description of an embodiment example with the help of the figures. Here.

DETAILED DESCRIPTION

From a synopsis of the FIGS. 1 to 5 the structure of the stirrup bracket 1 according to the present invention comprises two supporting arms 2, 3 being arranged spaced from one another. In addition, the stirrup bracket 1 comprises a connecting arm 4 with two end regions 5 and 6 which are connected with one corresponding connecting region 7 and 8 each, respectively, of the supporting arms 2 and 3, respectively. This, in particularly, can be seen in the views of the FIGS. 2 and 3. In these views it can clearly be seen that in this instance the supporting arms 2, 3 and the connecting arm 4 are integrally connected with each other.

Figure 2:
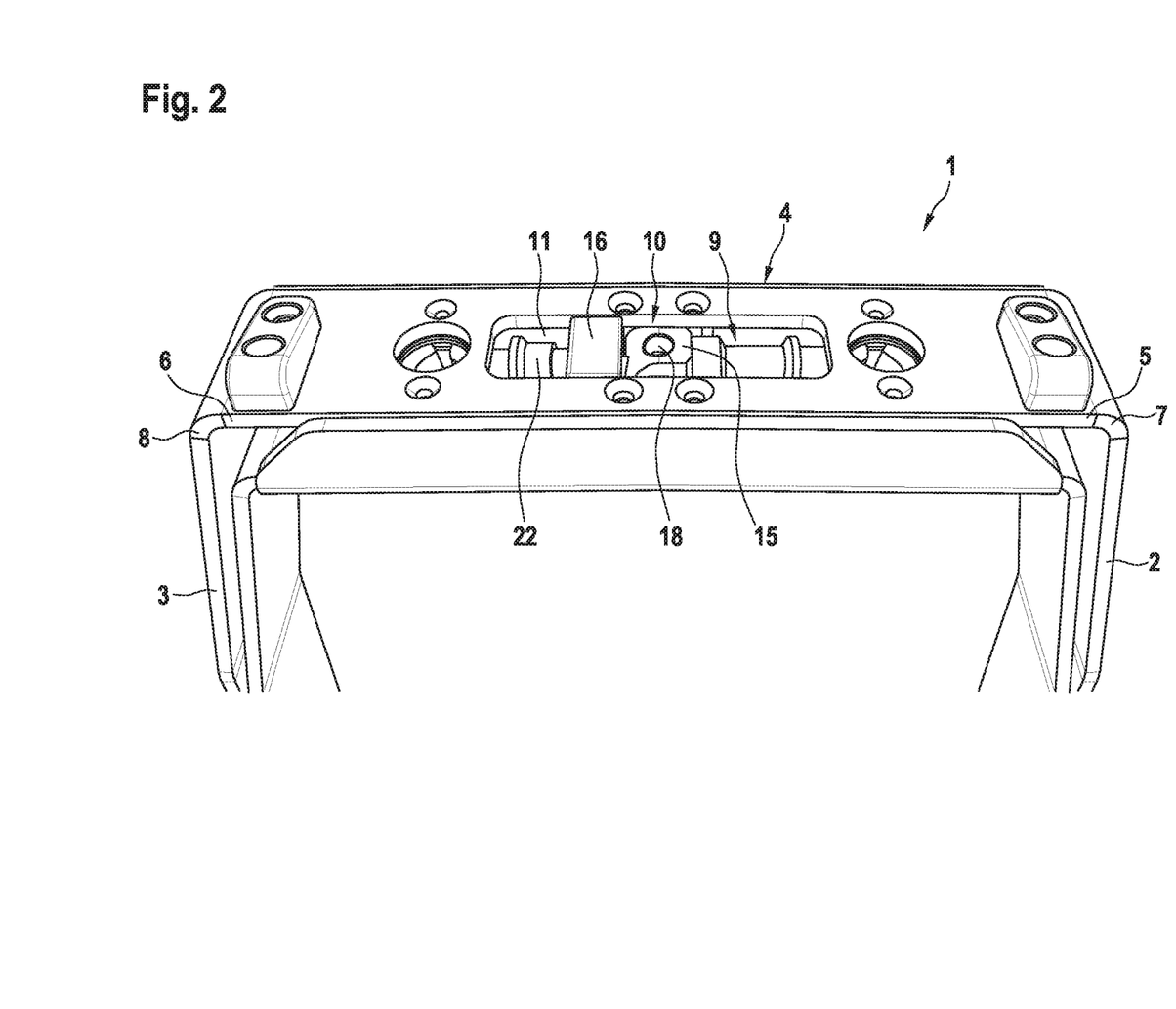
FIG. 2 shows a perspective view of the stirrup bracket according to the present invention with a connecting spigot in idle position.
Figure 3:
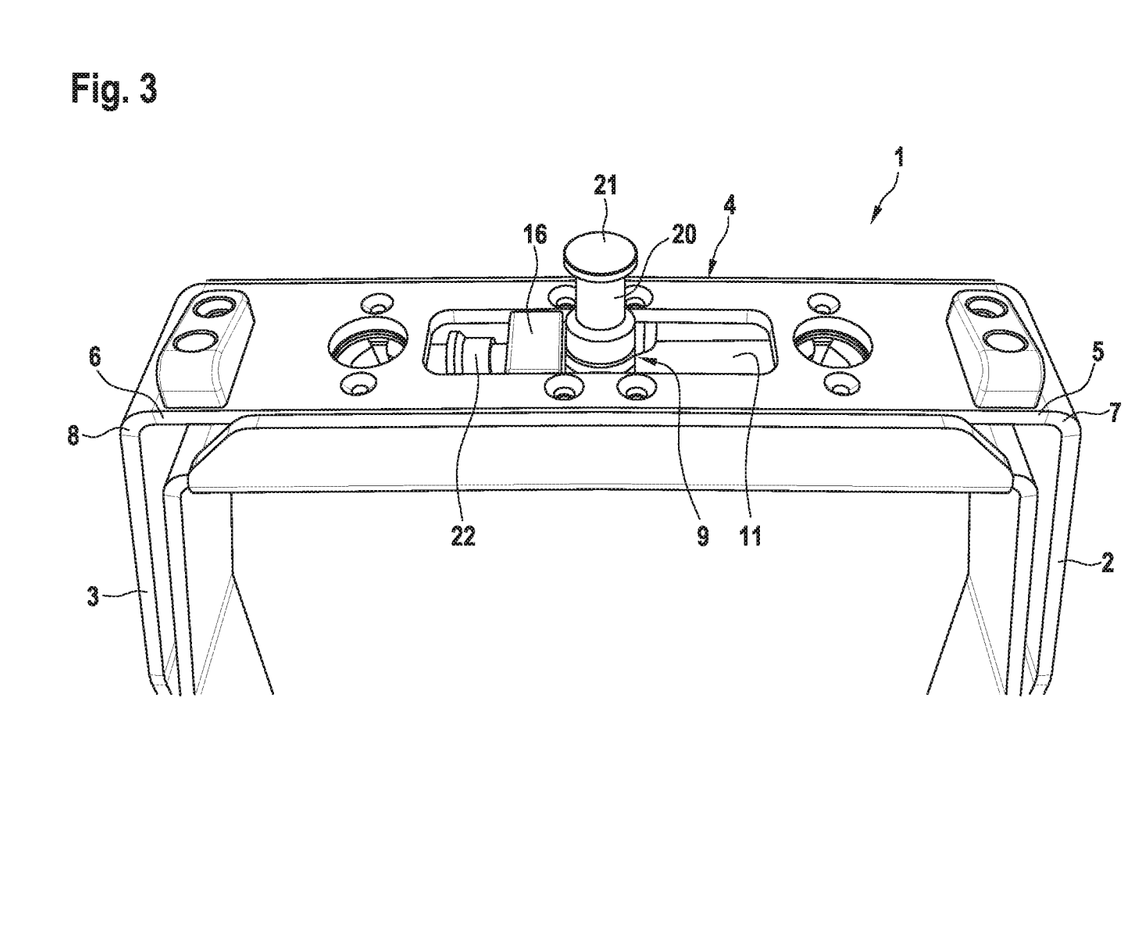
FIG. 3 shows a view which corresponds to FIG. 2, wherein here the connecting spigot is in the operating position.

As can be followed from a synopsis of the FIGS. 2 and 3, a connecting spigot 9 is pivot-mounted between an idle position which can be seen in FIG. 2 and an operating position which can be seen in FIG. 3 on the connecting arm 4. In the idle position according to FIG. 2 the connecting spigot 9 plunges into an opening or passage opening 11 of the connecting arm 4, thus does not protrude from the plane of the connecting arm 4.

On the other hand, FIG. 3 illustrates the operating position of the connecting arm 9 in which the connecting arm 9 is swiveled out of the passage opening 11 and thus protrudes beyond the outer side of the connecting arm 4 and in this operating position can be connected with suspensions or supporting clamps. For that the connecting spigot 9 comprises a slip-in cylinder 20 which on the face side is provided with a supporting disc 21, wherein the diameter thereof is greater than the diameter of the slip-in cylinder 20. Via this slip-in cylinder 20 and the supporting disc 21 the connecting spigot can, for example, be inserted into an assembly opening of a universal clamp, wherein a locking pin may be configured to engage behind the supporting disc 21 for being able to detachably fix the stirrup bracket 1 at the supporting clamp.

Figure 4:
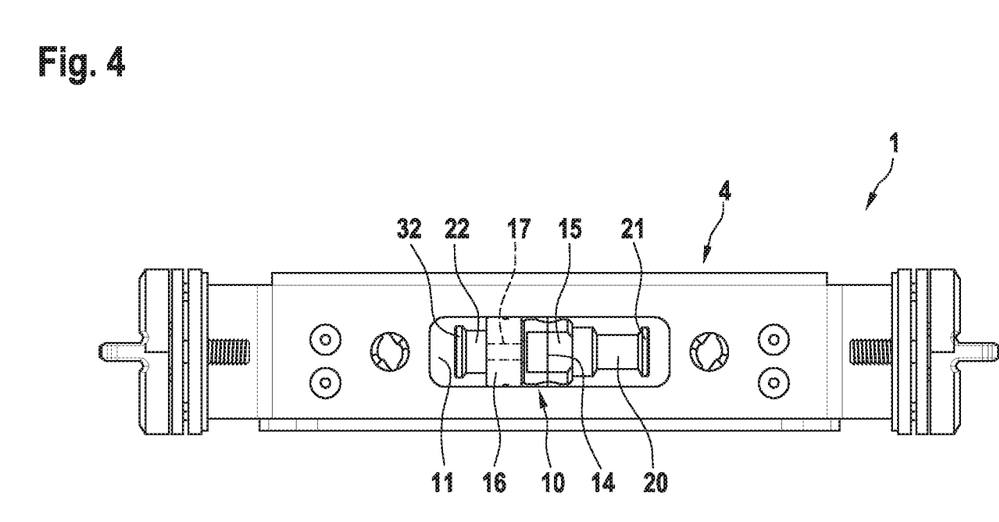
FIG. 4 shows a front view of a connecting arm of the stirrup bracket according to the present invention.
Figure 5:
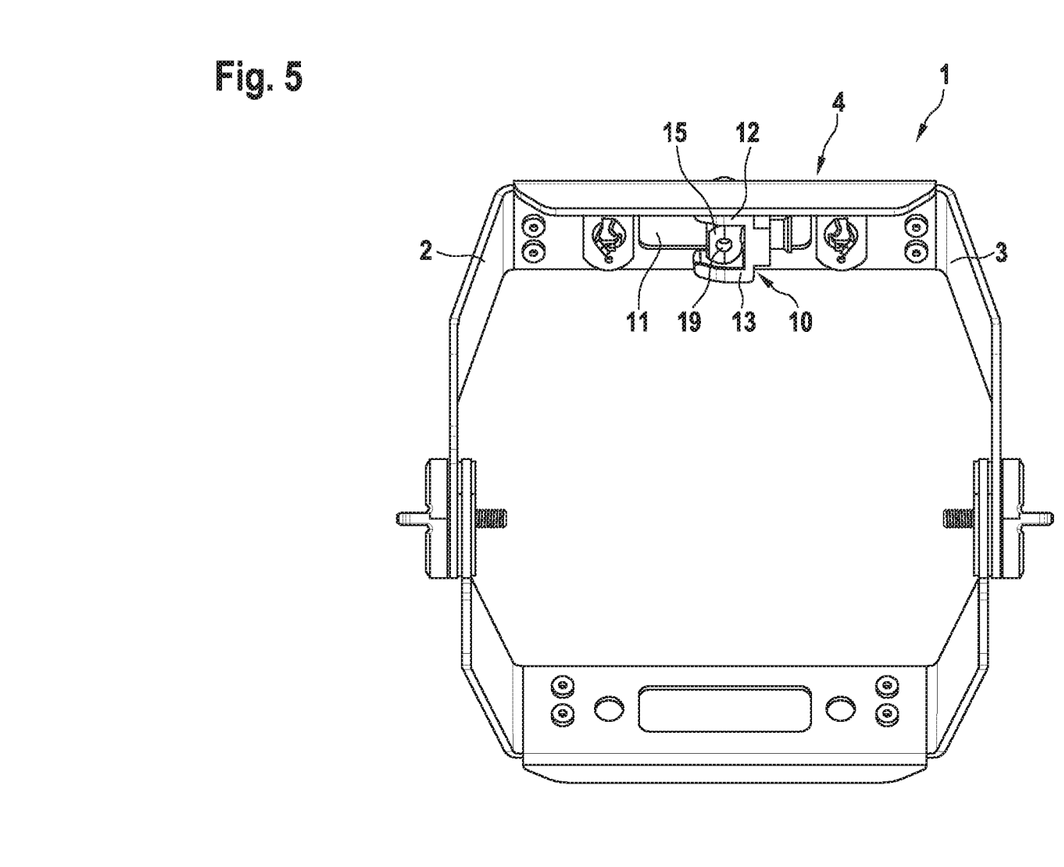
FIG. 5 shows a perspective view of the back side of the connecting arm of the stirrup bracket according to the present invention.

As in particularly from a synopsis of the FIGS. 4 and 5 results, for the pivot-mounting of the connecting spigot 9 a swivel device 10 is provided which is attached on the connecting arm 4 adjacent to the passage opening 11 being arranged in the connecting arm 4.

For that, the swivel device 10 comprises two mounting blocks 12 and 13 being arranged on both sides of the passage opening 11 which can be seen in the view of FIG. 5. The mounting blocks 12 and 13 pivotably mount the ends of a swiveling pin 14 which is shown in FIG. 4 in a simplified manner by a line, wherein the swiveling pin 14 crosses a spigot accommodating region 15. When the connecting spigot 9 is swiveled, the swiveling pin 14 is swiveled in the mounting blocks 12 and 13 being attached on the connecting arm 4 together with the spigot accommodating region 15 as well as the slip-in cylinder 20 and the supporting disc 21 being affixed at it. In an alternative to a swiveling pin 14 which crosses the spigot accommodating region 15 it is also possible to integrally mold two swiveling pin portions each at the spigot accommodating region 15 which can integrally be molded on the respective outer surface of the swiveling pin 14.

The mounting blocks 12 and 13 are each connected with a screw block 16 which in particularly can be seen in FIG. 4. The screw block 16 comprises an internal thread 17 being shown by a dashed line in which a locking screw 22 can be placed which can be screwed in and out. With this locking screw 22 it is possible to stably position the connecting spigot 9 in its idle position and in its operating position, and for that the spigot accommodating region 15 comprises two fixing openings 18 and 19 being arranged at an angle of 90° to one another. The fixing opening 19 can be seen in FIG. 5 and serves for locking the connecting spigot 9 in its idle position via the locking screw 22. The fixing opening 18 can be seen in FIG. 2 and serves for locking the connecting spigot 9 in its operating position with the help of the locking screw 22. For that the locking screw 22 comprises a spring-mounted pin which cannot be seen in the figures and which with one of its ends can engage with the fixing openings 18 or 19 and on its other end comprises an external thread via which it can be screwed into a round handle 32 by interposing a spring which is also not shown in the figures. Between the spring and the handle 32 a threaded piece is inserted via which the locking screw can be screwed in and out of the internal thread 17. By untightening both locked swiveling positions of the connecting spigot 9, in the case of a locking screw 22 which is screwed in, it is possible to pull the handle 32 so that the pin can be pulled out from the respective fixing opening 18 or 19 against the spring force of the integrated spring. When the handle 32 is released, the pin can again engage with the respective fixing opening 18 or 19 due to the force of the compression spring.

Preferably, the swivel device 10 is detachably attached on the connecting arm 4, and for that, for example, a bolted connection can be provided.

Figure 1:
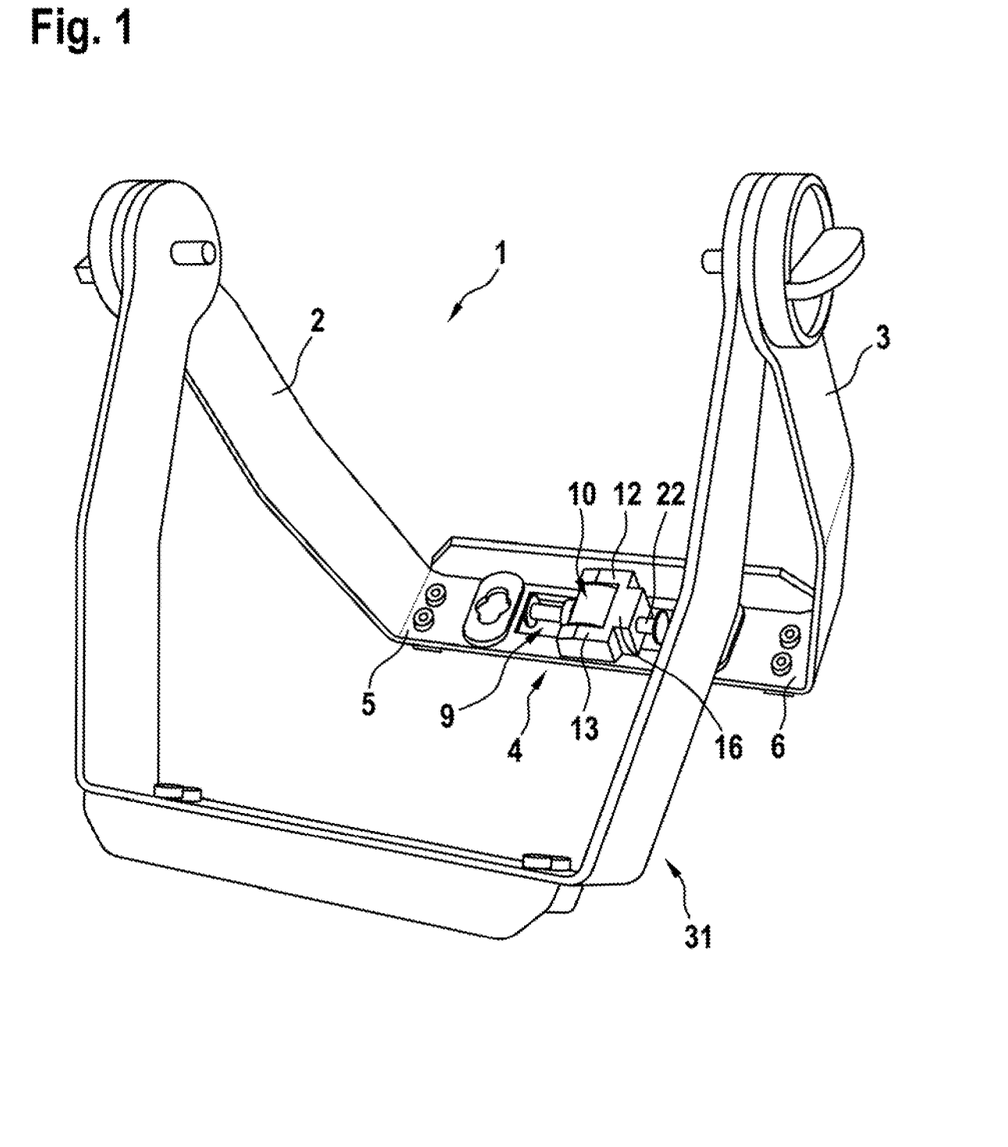
FIG. 1 shows a perspective view of a stirrup bracket according to the present invention in connection with a further holder being installed on it for forming a pedestal.

In the case of the design of a pedestal according to FIG. 1 a second stirrup bracket 31 is provided which in principal can have the same structure like stirrup bracket 1, thus, for example, can also be provided with a pivotable connecting spigot 9. But this is not mandatory, because it is also possible only to provide the stirrup bracket 1 with such a connecting spigot 9 and the swivel device 10 described above.

Figure 6:
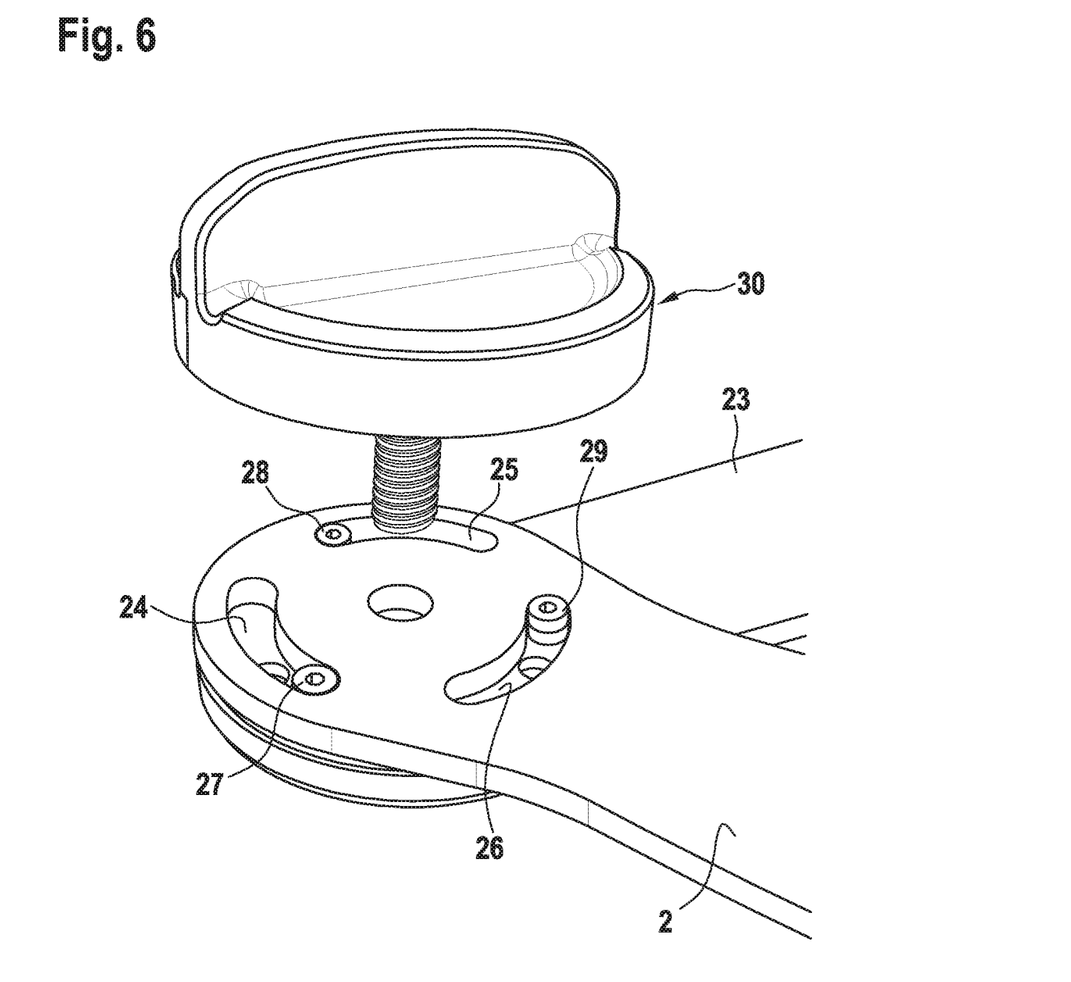
FIG. 6 shows a perspective partial view for explaining a possible connection of both, the stirrup bracket and the holder which are shown in FIG. 1.

For connecting both stirrup brackets 1 and 31 a connecting device is provided which is shown in detail in FIG. 6. This connecting device comprises in the end regions of two connecting arms which have to be connected with each other, in the instance of the connecting arms 2 and 23, three curved guiding grooves 24, 25 and 26 being arranged in an angular distance of 120° in which corresponding respective guiding cylinders 27, 28 and 29, respectively, are guided. FIG. 6 shows a situation such as can be seen in FIG. 1, thus a situation in which both stirrup brackets 1 and 31 are folded apart and in this situation are fixed by a locking screw 30 which can be screwed in a thread of the connecting arm 23 which cannot be seen in FIG. 6 due to the chosen view.

In addition to the above written disclosure herewith explicitly reference is made to the graphic presentation of the invention in the FIGS. 1 to 6 for completing the disclosure.

LIST OF REFERENCE SIGNS 1 stirrup bracket
2, 3 supporting arms
4 connecting arm
5, 6 end regions
7, 8 connecting regions
9 connecting spigot
10 swivel device
11 passage opening
12, 13 mounting blocks
14 swiveling pin
15 spigot accommodating region
16 screw block
17 internal feed-through
18, 19 fixing openings
20 slip-in cylinder
21 supporting disc
22 locking screw
23 connecting arm
24, 25, 26 guiding grooves
27, 28, 29 guiding cylinders
30 locking screw
31 stirrup bracket
32 handle

The invention claimed is:

1. A stirrup bracket (1), comprising:
two supporting arms (2, 3) being arranged spaced from one another and
a connecting arm (4) comprising two end regions (5, 6) which are connected with one corresponding connecting region (7 or 8) of each of the two supporting arms (2, 3),
wherein the connecting arm (4) is provided with a connecting spigot (9) being pivot-mounted between an idle position and an operating position,
and wherein in the idle position the connecting spigot (9) plunges into a passage opening (11) in the connecting arm (4) so that the connecting spigot (9) does not protrude outwardly from the connecting arm (4) in the idle position,
wherein the pivot-mounting of the connecting spigot (9) includes a swivel device (10) which is attached on the connecting arm (4) adjacent to the passage opening (11) being provided in the connecting arm (4), and
wherein the swivel device (10) comprises two mounting blocks (12, 13) being attached on the connecting arm (4) on respective opposite sides of the passage opening (11) with the mounting blocks (12, 13) respectively pivotally mounting ends of a swiveling pin (14) with the swiveling pin (14) crossing a spigot accommodating region (15) of the connecting spigot (9).

2. The stirrup bracket according to claim 1, characterized in that the mounting blocks (12, 13) are connected with a screw block (16).

3. The stirrup bracket according to claim 2, characterized in that the screw block (16) is provided with an internal thread (17) for engaging a locking screw (22) which is configured to be screwed in and out within the screw block (16) to stably position the connecting spigot (9) in the idle position.

4. The stirrup bracket according to claim 3, characterized in that the spigot accommodating region (15) is provided with two fixing openings (18, 19).

5. The stirrup bracket according to claim 1, characterized in that a slip-in cylinder (20) is adjacent to the spigot accommodating region (15).

6. The stirrup bracket according to claim 5, characterized in that a supporting disc (21) is arranged at a free end of the slip-in cylinder (20).

7. The stirrup bracket according to claim 6, characterized in that a diameter of the supporting disc (21) is greater than a diameter of the slip-in cylinder (20).

8. The stirrup bracket according to claim 1, characterized in that the swivel device (10) is detachably attached on the connecting arm (4).

9. The stirrup bracket according to claim 2, characterized in that a slip-in cylinder of the spigot (9) is adjacent to the spigot accommodating region (15).

10. The stirrup bracket according to claim 3, characterized in that a slip-in cylinder of the spigot (9) is adjacent to the spigot accommodating region (15).

11. The stirrup bracket according to claim 4, characterized in that a slip-in cylinder of the spigot (9) is adjacent to the spigot accommodating region (15).

12. The stirrup bracket according to claim 2, characterized in that the swivel device (10) is detachably attached on the connecting arm (4).

13. The stirrup bracket according to claim 3, characterized in that the swivel device (10) is detachably attached on the connecting arm (4).

14. The stirrup bracket according to claim 4, characterized in that the swivel device (10) is detachably attached on the connecting arm (4).

15. The stirrup bracket according to claim 5, characterized in that the swivel device (10) is detachably attached on the connecting arm (4).

16. The stirrup bracket according to claim 6, characterized in that the swivel device (10) is detachably attached on the connecting arm (4).

17. The stirrup bracket according to claim 7, characterized in that the swivel device (10) is detachably attached on the connecting arm (4).

* * * * *